(12) United States Patent
Galvano et al.

(10) Patent No.: US 7,911,193 B2
(45) Date of Patent: Mar. 22, 2011

(54) DISCONTINUOUS CONDUCTION MODE CONTROL CIRCUIT AND METHOD FOR SYNCHRONOUS CONVERTER

(75) Inventors: Maurizio Galvano, Padua (IT); Giuseppe Bernacchia, Noventa Padovana (IT); Giovanni Capodivacca, Padua (IT)

(73) Assignee: Infineon Technologies Austria AG, Villach (AT)

( * ) Notice: Subject to any disclaimer, the term of this patent is extended or adjusted under 35 U.S.C. 154(b) by 411 days.

(21) Appl. No.: 12/164,954

(22) Filed: Jun. 30, 2008

(65) Prior Publication Data

US 2009/0323375 A1      Dec. 31, 2009

(51) Int. Cl.
*G05F 1/575* (2006.01)
*G05F 1/565* (2006.01)

(52) U.S. Cl. ......................................... 323/284; 323/285
(58) Field of Classification Search .................. 323/224, 323/282, 284, 285, 283
See application file for complete search history.

(56) References Cited

U.S. PATENT DOCUMENTS

| 7,479,766 | B2 * | 1/2009 | Sutardja et al. | 323/222 |
| 7,652,945 | B2 * | 1/2010 | Chu et al. | 365/226 |
| 7,701,188 | B2 * | 4/2010 | Kojima | 323/284 |
| 7,804,285 | B2 * | 9/2010 | Nishida | 323/284 |

* cited by examiner

*Primary Examiner* — Gary L Laxton
(74) *Attorney, Agent, or Firm* — Slater & Matsil, L.L.P.

(57) ABSTRACT

In a circuit, a high side driver control circuit outputs gating signals to a high side driver of a synchronous converter responsive to a pulse width modulated input signal. A synchronous rectifier driver circuit outputs a gating signal to a synchronous rectifier of the synchronous converter responsive to the pulse width modulated input signal. An inhibit circuit inhibits the gating signal to the synchronous rectifier upon detection of a zero crossing condition. A circuit detects the zero crossing condition respective to comparing a measured value to a nominal value adjusted by a delta value. A duty cycle observer circuit determines the average duty cycle of the pulse width modulated input signal and varies the reference value.

28 Claims, 11 Drawing Sheets

DISCONTINUOUS CONDUCTION MODE CONTROL CIRCUIT AND METHOD FOR SYNCHRONOUS CONVERTER

TECHNICAL FIELD

The present invention relates generally to a system and method to improve the operation of power supply circuits such as are used in a switched mode power supply converter including multiphase power converters and DC-DC converters, and more particularly to a system and method for efficient operation of a DC-DC converter circuit using diode emulation during discontinuous conduction mode ("DCM") which occurs during light load current operation.

BACKGROUND

Generally, buck power converters or buck regulators are used to generate power outputs for microelectronic devices. Although other converter topologies such as boost, buck boost, and the like are available, buck converters are often used because the buck converter topology is relatively efficient and provides high current swing (di/dt) capability. When providing a microelectronic circuit such as a microprocessor, for example, with a regulated voltage, current swing di/dt and response time are very important considerations in selecting the power converter. The output inductor value of the regulator determines the di/dt capability of the regulator. This inductor value also determines the operation boundary between the continuous conduction mode ("CCM") and the discontinuous conduction mode. In CCM, the current flowing through the inductor is continuous; the load is demanding current at some level that requires input current from the supply for each cycle of the switched converter. In DCM, the load is demanding no, or light, current output. In this mode, the inductor current is not continuous but drops to zero. This phenomenon indicates that the load demand is light enough that an entire cycle of the switching converter may pass without the need for any additional power input from the supply into the converter.

FIG. 1(a) depicts, for illustrative purposes, a buck converter topology known in the prior art and described as an asynchronous buck converter. In FIG. 1(a) the high side driver M1 receives a pulse width modulated (PWM), usually a constant frequency square wave gating signal at its gate. In response, transistor M1 provides current into inductor L. In a CCM mode operation where the load is taking current out at a regular rate, the output voltage is maintained by a controller IC (not shown) that compares the output voltage Vo to a reference voltage (also not shown here for simplicity). The controller IC then changes the pulse width of the PWM signal to the gate of transistor M1 to provide the needed current. In this manner, the circuit continuously provides current to the load. If the output voltage Vo drops, additional power into the load is provided by a wider pulse signal on the high side driver M1 to compensate. If the output voltage Vo rises beyond the reference voltage, the controller then modifies the PWM pulse signal. The gating signal to the high side driver is narrowed or shorter in time, providing less energy into the inductor and the output capacitor and thus, the output voltage will again fall to the reference value.

When the load demands no, or a low, current, the circuit operates in a low voltage output situation (since Vo=the load current times the load resistance, shown as RL). In this situation, the asynchronous topology of FIG. 1(a) exhibits some inefficiency because the diode has a 0.7V drop across it. These inefficiencies may be tolerable if the load typically does not operate in a light load condition. However, for situations where the load is often operated in a light load condition, for example for a microprocessor that has a "sleep" or standby mode, these inefficiencies are not acceptable.

In response to the inefficiencies in the asynchronous buck converter, the synchronous buck converter topology was developed. In this converter, the diode of the asynchronous buck converter is replaced with another device, typically a MOSFET. This device is usually referred to as a "synchronous rectifier" or "SR"; in some literature the term "low side driver" may be used. FIG. 1(b) illustrates this topology. In FIG. 1(b) M2 is the SR. This SR driver will have a low resistance (low RDSON) and by gating signals to both the high and the SR, the controller IC (not shown) may efficiently control the voltage Vout for a variety of conditions.

However, the light load condition still presents problems with the synchronous buck converter and efficiency. FIG. 2 depicts the current (inductor current IL) and voltage (taken at the middle node labeled "phase" in FIG. 1(b)) in the light load current or DCM mode of operation in a synchronous buck converter.

In FIG. 2, it can be seen at the point labeled T1 that the current IL through the inductor L of FIG. 1(b) becomes negative during a portion of the cycle. Negative current IL means current is flowing from the output circuitry and into ground or in some circuit topologies, back to the positive supply voltage node. This essentially means the output capacitor Co, see FIG. 1(b), is being discharged into ground through the current conduction path of synchronous rectifier M2. This loss phenomenon did not occur in the asynchronous buck topology of FIG. 1(a) because the diode (rectifier) is unidirectional, that is, current is not allowed to flow in that direction. Ideally the SR in the synchronous buck converter of FIG. 1(b) would be operated to emulate the diode in the asynchronous buck converter of FIG. 1(a) and prevent the current loss phenomenon.

To improve the efficiency of the synchronous buck converter, attempts are made to shut off the gating signal to the SR (M2 in FIG. 1(b)), typically a MOSFET transistor, when the current polarity through the inductor changes (indicating the load is discharging to ground). In this manner, energy stored in the output capacitor is not lost, but maintained in the output circuit for later use.

Looking at FIG. 2, it can be seen that the point in time that current flow should stop is the "zero crossing" point of the IL trace, labeled T1. Conveniently, the voltage at the phase node also crosses zero at this point, so that voltage sensing approaches may be used to identify this point where the output capacitor is starting to discharge. Prior art circuits typically attempt to stop current flow at this point by sensing it. However, present approaches to controlling the turn off time of the SR are sensitive to delays in the logic or buffers, voltage and temperature variations, and device characteristics of the SR device. These characteristics deleteriously affect the circuit operation.

With reference now to FIG. 3, a prior art solution to improving the operation of a synchronous buck converter in light load or DCM condition is shown. In FIG. 3, a circuit 11 is provided coupled between the driver or driver/controller IC (not shown) that provides the PWM signal used to form gating signals to control the high side driver and the SR. Circuit 11 includes a logic driver 13 that outputs gating signals $G_{SR}$ and $G_{HS}$. Buffers 21 and 19 coupled to provide gating signals labeled High Side and SR, and these are coupled to the drivers M1 and M2. Circuit 11 also provides a comparator 17 coupled to the "phase" node at the intersection between the high side driver and the SR and the output inductor L. This comparator circuitry 17 provides the zero crossing detection that is intended to improve the efficiency of the buck converter under lightly loaded or DCM conditions.

The comparator 17 has an optional enable input also tied to the logic driver 13, so that the comparator is only enabled when the logic driver is sending an active $G_{SR}$ signal SR to M2.

The approach taken in the circuit of FIG. 3 is to make the synchronous buck converter operate similarly to the asynchronous buck converter in DCM mode, used for lightly loaded conditions, where the load does not require the converter to provide energy every cycle. Essentially the control of the SR device M2 should be performed such that current will not flow out of the load into ground, that is, the SR M2 should emulate the diode of the asynchronous buck converter. This "diode emulation" is accomplished by attempting to turn off the SR transistor M2 to block current IL from flowing in a negative direction from the inductor L.

Comparator 17 compares the voltage on the "phase" node to a reference voltage. In a simple approach, the reference voltage would be set at 0 volts. However, to compensate for the circuitry which may include a voltage offset or a delay, the reference voltage –Vref may be modified to be less than or greater than zero. This is done to make the circuit operate in a more efficient manner in a practical system. This is a simple compensation, or manual trimming, approach.

When the comparator 17 detects the zero voltage condition on the phase node, the AND gate 15 will shut off the gating signal through the low side buffer 19 and thus shut off the SR M2. Although shown very simply here, additional enable logic may be used to indicate to the comparator that the circuit is in DCM mode so that the comparator does not interfere with the gating signal when the circuit is operating in CCM mode. In any event the EN signal to the comparator, in conjunction with the operation of AND gate 15, will turn off the gating signal to the SR device at time T1 in FIG. 2, thus using voltage sensing on the phase node to locate the zero crossing point in the current trace of FIG. 2.

The prior art circuit of FIG. 3 is dependent on a fixed reference voltage Vref. The circuit is known to be sensitive to delay, temperature, noise and process variations. Further, the voltage at the phase node is dependent on the current path or RDSON resistance of the SR transistor M2, which may vary with temperature as well. Although this prior art approach is somewhat better than the basic synchronous converter of FIG. 1(b), inefficiencies still remain FIG. 4 is a timing diagram for a simulation of a buck converter as in FIG. 3 illustrating the phase node voltage sensing approach in operation. The top trace of FIG. 4, labeled "phase (V)", illustrates a detailed view of the voltage at the phase node. The second trace from the top, labeled "phase, Vout", illustrates the phase node voltage and the output voltage taken together.

The third trace from the top, labeled $I_L$, illustrates a timing diagram of the load current (in amps). The bottom trace of FIG. 4, labeled "$G_{HS}$, $G_{SR}$" illustrates the voltages of the gating signals output by the control circuit 11 in FIG. 3 to the transistors M1 and SR.

In operation, the comparator 17 will detect the point when the phase node voltage and the output voltage are equal, while the SR gating signal $G_{SR}$ is high (EN into the comparator). At this point in time, the AND gate 15 will cause the SR device to turn off, thereby preventing current flow into the SR device. The load current $I_L$ then cannot go below zero. In FIG. 4, this occurs at time T1, where the operation of the zero crossing detection circuits is shown by the flat bottom in the load current $I_L$ at about 0 Amps.

The topology of the buck converter of FIG. 3 is used only as one illustrative example of the zero crossing detection principle used to cause the "diode emulation". The same principle of determining the zero crossing detection for the output current using voltage sensing of the phase node, in relation to another voltage, may be applied to other common synchronous converter topologies.

FIG. 5 depicts a prior art boost topology switching converter circuit with phase node voltage sensing. Similar reference designators are used for like elements that are shown in FIGS. 1, and 3. In FIG. 5 positive supply voltage PVCC is coupled through an inductor L to the phase node. Synchronous rectifier SR couples the voltage at the phase node to an output terminal Vo, to supply current into the load RL, and output capacitor Co. A driver M1 will couple the phase node to ground in response to a gating signal $G_{LS}$ from Driver Logic 13. (Note that buffers 19, 21 of FIG. 3 will typically be present at the outputs of the Driver Logic 13 to drive the power devices M1, M2 but are omitted here for clarity). Comparator 17 compares the output voltage Vo to the voltage at the phase node, and when enabled by the gating signal $G_{SR}$ provided by the Driver Logic 13, 17 will output a compare signal. AND gate 15 will turn OFF the SR device when the comparator is enabled and a match between the voltages at "phase" and the output voltage "Vo" is detected. In operation, Driver Logic 13 develops the gating signals for M1, and M2, in response to the transitions in the PWM input signal. By alternating the current from inductor L into the output circuit capacitor Co, and into ground, the output voltage may be regulated by switching signals. The boost converter can provide an output voltage Vo higher than the supply voltage PVCC.

FIG. 6 depicts a timing diagram illustrating the operation of the boost topology converter of FIG. 5. In FIG. 6, the top trace labeled "phase (V)" depicts a detailed timing view of the voltage at the node phase in FIG. 5. The next trace down, labeled "phase, Vout (V)", depicts a timing diagram of the voltages at those nodes taken together. The trace labeled $I_L$ (A) is a timing diagram of the current $I_L$ for a simulated boost circuit in configured in a typical configuration. The bottom trace illustrates the gating signal voltages $G_{SR}$, $G_{LS}$.

As can be seen in FIG. 6, when the phase voltage and the output voltage are equal and the gate signal $G_{SR}$ is high, at time T1, the current $I_L$ is nearing the zero crossing point. In this simulation the $G_{SR}$ signal to the SR device is gated OFF by the operation of the comparator 17 and the current $I_L$ is not permitted to become negative, thereby preventing the loss that would otherwise occur (capacitor Co would discharge into the converter circuit.)

FIGS. 7 and 8 depict how voltage sensing of the phase node to detect the zero crossing point of the current $I_L$ can be applied to an inverting, and a non inverting buck-boost converter, respectively. FIG. 7 depicts the conventional inverting buck boost topology. Again identical reference designators are used for the like elements from FIGS. 3 and 5. The buck-boost circuit may be used to regulate the output voltage to be more, or less than, the input voltage (inverted) and so has utility in certain applications beyond the simple buck, or boost, converter topologies.

FIG. 8 is a prior art non-inverting buck-boost converter circuit. As is known to those skilled in the art, by providing two distinct stages, the buck boost converter may be configured in a non-inverting mode. A separate buck and boost synchronous rectifier $SR_{BU}$ and $SR_{BO}$ is provided, and phase node sensing is performed for each of these using the comparators 18, and 17; but the zero crossing detection approaches are generally the same as those described above.

FIG. 9 illustrates the timing diagram for a simulation using the inverting buck-boost converter topology of FIG. 7; again illustrating the phase voltage sensing for the zero crossing detection, and the comparator providing diode emulation. As can be seen at the time T1, the comparator and AND gate are turning the gate signal to the SR device OFF to prevent the current $I_L$ from flowing back into the converter circuit.

Thus the same principle for detecting the zero crossing point is applied to the buck, boost and buck-boost switching converter topologies in the prior art approaches. Voltage sensing on the phase node is performed and compared to another available circuit voltage selected in order to determine the zero crossing point for the output current $I_L$. Generally, the SR gating signal is then affected by turning off the conduction path to prevent negative current flow, thus the SR device emulates the diode of the asynchronous converter. The negative current flow that would otherwise discharge the output capacitor Co unnecessarily is prevented.

The voltage sensing circuits for zero crossing detection in the switched converters of the prior art are known to be subject to inefficient operations due to delays in logic circuitry, variations in power, temperature and process, and variations in device parameters which continue to cause less than desirable operation.

A continuing need thus exists for an efficient and reliable circuit and methods to control the operations of a switching converter circuit in DCM mode.

SUMMARY OF THE INVENTION

These and other problems are generally solved or circumvented, and technical advantages are generally achieved, by preferred embodiments of the present invention which provide an efficient and reliable detection of the inductor current crossing the zero point in a synchronous DC-DC converter during DCM mode conditions, and the various embodiments provide control of the gating signals to increase the efficiency of the converter in DCM. The following summary is not an exclusive list of the embodiments and is not limiting of the embodiments, the invention or the scope of the appended claims. Embodiments of the invention are applicable to converter circuits for buck, boost, buck-boost topologies and synchronous converters where the zero crossing point for the load current is detected and control signals are developed to prevent losses (load current being discharged into the converter circuit) to enhance efficiency of the converter operations.

In an exemplary embodiment, a method for controlling a synchronous converter is provided comprising providing a synchronous rectifier (SR) gating control signal in response to a pulse width modulated input signal for use in a synchronous converter; receiving a measured circuit value from the synchronous converter; comparing the measured circuit value to a reference value that may be adjusted by a delta value; inhibiting the SR gating control signal in response to the output of the comparison; adjusting the reference value by a predetermined delta value; determining if the average duty cycle for the pulse width modulated input signal is increased in response to the adjusting; and repeating the last two steps until the average duty cycle for the pulse width modulated input signal is increased.

In another exemplary embodiment, the above described method wherein determining if the average duty cycle for the pulse width modulated signal is increased comprises further comprises determining the duty cycle of the pulse width modulated input signal for n cycles; determining the present average duty cycle for the n cycles; comparing the present average duty cycle for the n cycles to a stored prior average duty cycle; and indicating whether the present average duty cycle is increasing.

In another exemplary embodiment, a circuit is provided comprising a high side driver control circuit for outputting a gating signal to a high side driver of a synchronous converter responsive to a pulse width modulated input signal; a synchronous rectifier (SR) driver circuit for outputting a gating signal to a SR driver of a synchronous converter responsive to the pulse wide modulated input signal; an inhibit circuit for inhibiting the gating signal to the SR driver circuit upon detection of a zero crossing condition; a comparator receiving a voltage reference and a phase node voltage from the synchronous converter and outputting a zero crossing condition; and a duty cycle observer circuit for determining the average duty cycle of the pulse width modulated input signal and for varying the voltage reference.

In another exemplary embodiment, an integrated circuit is provided, comprising a first buffer circuit for driving a high side driver of a converter circuit responsive to a pulse width modulated input signal; a second buffer circuit for driving a synchronous rectifier (SR) of a converter circuit responsive to the pulse width modulated input signal; an inhibit circuit for inhibiting the second buffer circuit responsive to a comparison indicating a zero crossing condition; a comparator coupled to a measured circuit value input from the converter circuit and a reference value indicating the zero crossing condition when comparison is met; and a duty cycle observer circuit for determining the average duty cycle of the pulse width modulated input signal and having an output that varies the reference value by a predetermined delta value.

In another exemplary embodiment, a synchronous converter circuit is provided comprising a high side driver having a current conduction path coupled between a positive power supply and a phase voltage node, and having a high side control input; a synchronous rectifier (SR) driver having a current conduction path coupled between a phase voltage node and a ground reference, and having a SR control input; an output inductor coupled in series between the phase voltage node and a voltage output terminal for supplying a load; an output capacitor coupled between the voltage output terminal and the ground reference; and a gating signal control circuit for supplying the high side control input and the SR control input, comprising: a high side output buffer for driving the high side control input responsive to a pulse width modulated input signal; a SR output buffer for driving the SR control input responsive to the pulse width modulated input signal; an inhibit circuit for inhibiting the SR output buffer responsive to a comparator output; a comparator supplying the comparator output receiving the phase node voltage and a voltage reference; and a duty cycle observer circuit receiving the pulse width modulated signal and determining the duty cycle of the pulse width modulated signal and outputting the voltage reference responsive to the duty cycle.

In additional exemplary embodiments, the methods described above wherein the synchronous converter comprises a buck converter. In additional exemplary embodiments, the methods described above wherein the synchronous converter comprises a boost converter. In additional exemplary embodiments, the methods described above wherein the synchronous converter comprises a buck-boost converter.

BRIEF DESCRIPTION OF THE DRAWINGS

For a more complete understanding of the present invention, and the advantages thereof, reference is now made to the following descriptions taken in conjunction with the accompanying drawing, in which:

FIG. 1(*b*) illustrates a prior art synchronous buck converter;

The figures are presented to enhance comprehension of the exemplary embodiments and are representative, are not drawn to scale, and are not limiting with respect to the embodiments, the invention or the appended claims.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will now be described with respect to preferred embodiments in an illustrative, non-limiting, specific context, namely the DCM operation mode for a synchronous buck switching power converter. The invention may also be applied, however, to other circuits where a zero crossing detection is used, such as a boost, or buck-boost, a synchronous rectifier and the like that is used with a coil or inductor. In these exemplary circuit embodiments, a zero crossing detection may be used to control the switching of one or more drivers when the circuit is operating in a DCM mode and the zero crossing detection may then be automatically varied to determine the optimum zero crossing detection point in a feedback control loop.

Figure 10:
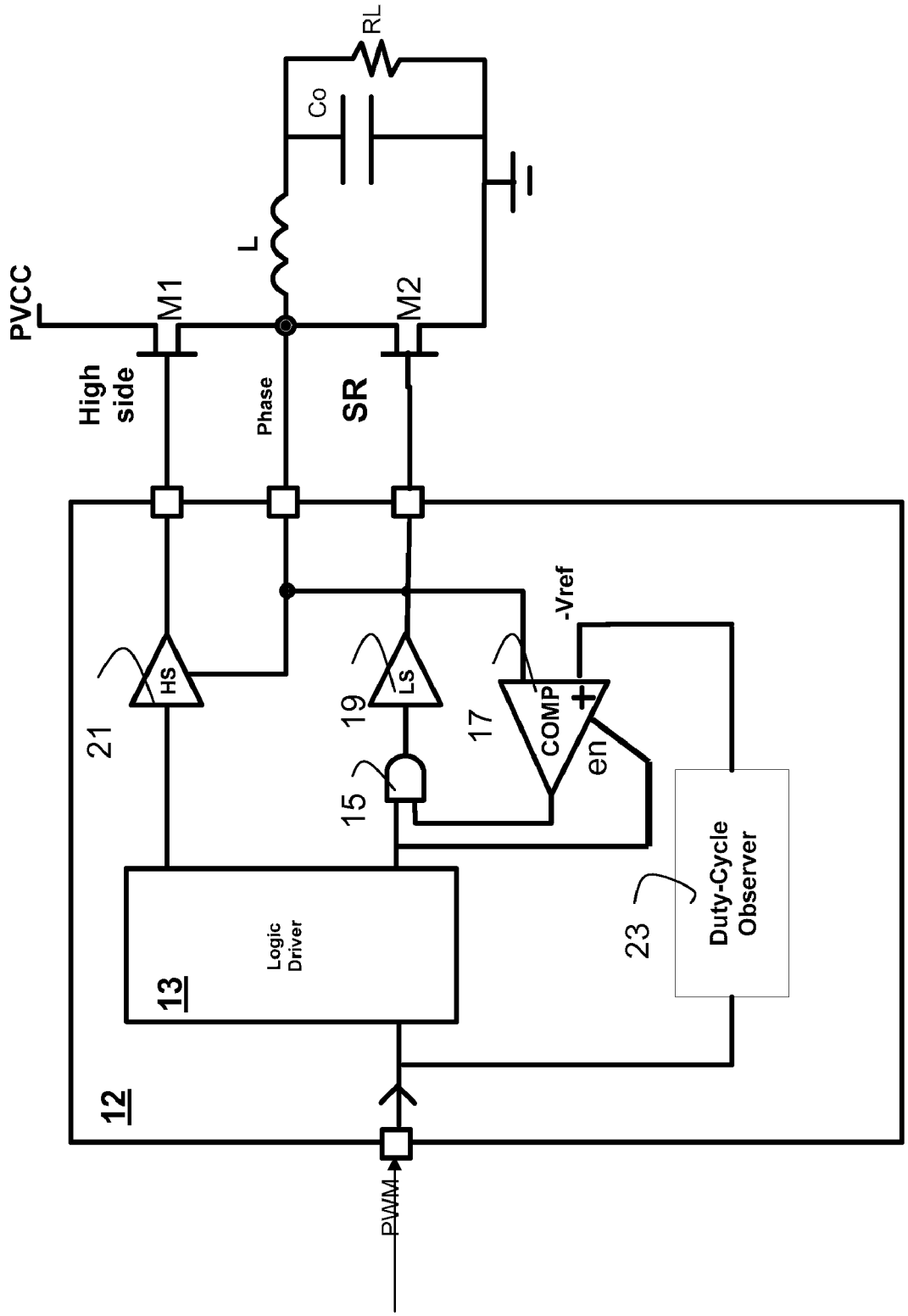
FIG. 10 illustrates an exemplary embodiment of the controller circuit of the invention.

In FIG. 10, a first exemplary embodiment of the invention is depicted. Circuit 12 is shown for providing the gating signals labeled "High side" and "SR" to a buck converter circuit comprised of drivers M1 and synchronous rectifier device M2. Inductor L and output capacitor Co are used for supplying an output voltage Vout, which is the output current flowing through the load, represented by element RL. Again a controller (not shown) provides the time varying input signal labeled PWM to maintain the output voltage Vo at a desired level, typically the appropriate duty cycle for signal PWM is determined by a comparator that receives the voltage at the output and a desired reference voltage.

Drivers 21 and 19 drive the gating signals High Side and SR to the MOSFET transistors M1 and M2 (M2 is the synchronous rectifier). AND gate 15 allows comparator 17 to gate the signal to the SR M2 off when the voltage at the phase node is below the reference voltage −Vref Duty cycle observer 23 is coupled to the PWM signal input and provides the voltage −Vref to the comparator 17.

In operation, the circuit of FIG. 10 automatically compensates the "turn off" time for the synchronous rectifier M2. In the exemplary embodiment shown here, the duty cycle observer 23 varies the voltage −Vref to perfect the zero crossing detection so that the synchronous converter circuit emulates the diode of the asynchronous buck converter in the most efficient manner. In an embodiment, the duty cycle observer circuit 23 will dynamically adjust the voltage reference −Vref, when the switching converter is operating in DCM mode, until the duty cycle reaches a local minimum duty cycle. When that phenomenon occurs, the converter circuit is expending the least amount of energy from the supply voltage PVCC. This means that the zero crossing detection indicated by the output of the comparator 17 is optimally adjusted. Note that the various components of circuit 12 may be incorporated into an integrated circuit including, or not including the driver transistors M1, M2, and including, or not including, the buffers 19 and 21. Further the overall PWM controller circuit may be provided as an external IC, and/or the circuit 12 may be integrated with those functions, or not, as alternative embodiments of the present invention.

The general approach embodied in the embodiments contemplates that if the "turn off" time is not optimal, the PWM duty cycle will typically increase. This is because, in DCM mode, if losses occur (output capacitor Co is discharging into the converter circuit); the output voltage will fall slightly. The PWM controller will then increase the PWM duty cycle to supply energy into the output circuit to maintain the output voltage. Therefore the duty cycle observer can operate in a feedback control loop by adaptively changing the "turn off" time, evaluating the resulting change in the duty cycle, and repeating this cycle until a minimum duty cycle is reached.

As a general approach, during discontinuous conduction mode or DCM, the duty cycle observer 23 will operate to vary the "turn off" time for the synchronous rectifier until the duty cycle reaches a minimum. In one exemplary approach, the voltage reference into the comparator 17 may be varied by some delta voltage. This reference voltage adjustment may be considered as a form of trimming and may, in one non-limiting exemplary approach, be performed in a test bench calibration. With the test bench emulating a light load current to force the circuit into DCM mode, the duty cycle is observed and the voltage −Vref is set at the optimum point to minimize the duty cycle observed during DCM. An alternative embodiment that does not require a manual trimming step is further disclosed below.

In another exemplary approach, the reference voltage into the comparator may be set at a nominal point and other forms of adaptive compensation may be used to adaptively change the "turn off" time of the SR MOSFET. The resulting change in the PWM duty cycle will be evaluated, and the duty cycle observer will thereby optimize the operation of the circuit in DCM mode. The form of compensation may be varied, and these alternatives are considered additional alternative embodiments of the present invention and are within the scope of the appended claims. The use of a control feedback loop that evaluates the PWM duty cycle and varies the compensation in order to reach the optimum operating point for efficient power usage is common to all of these embodiments.

In the particular exemplary embodiment shown, the duty cycle observer 23 function is to vary the value of −Vref in DCM mode until the PWM Duty-Cycle reaches its minimum value. This value of −Vref is the optimum for detection of the current crossing zero. When this voltage level for −Vref is used, the switching converter is operating at its most efficient "diode emulation" point and shuts off the SR at precisely the right instant for efficiency.

The duty cycle observer circuit 23 in FIG. 10 may be implemented in a variety of ways. A state machine could be used as an implementation, alternatively dedicated hardware could be used, programmable logic could be used or a processor executing stored instructions could be used to provide the function of duty cycle observer 23.

Figure 11:
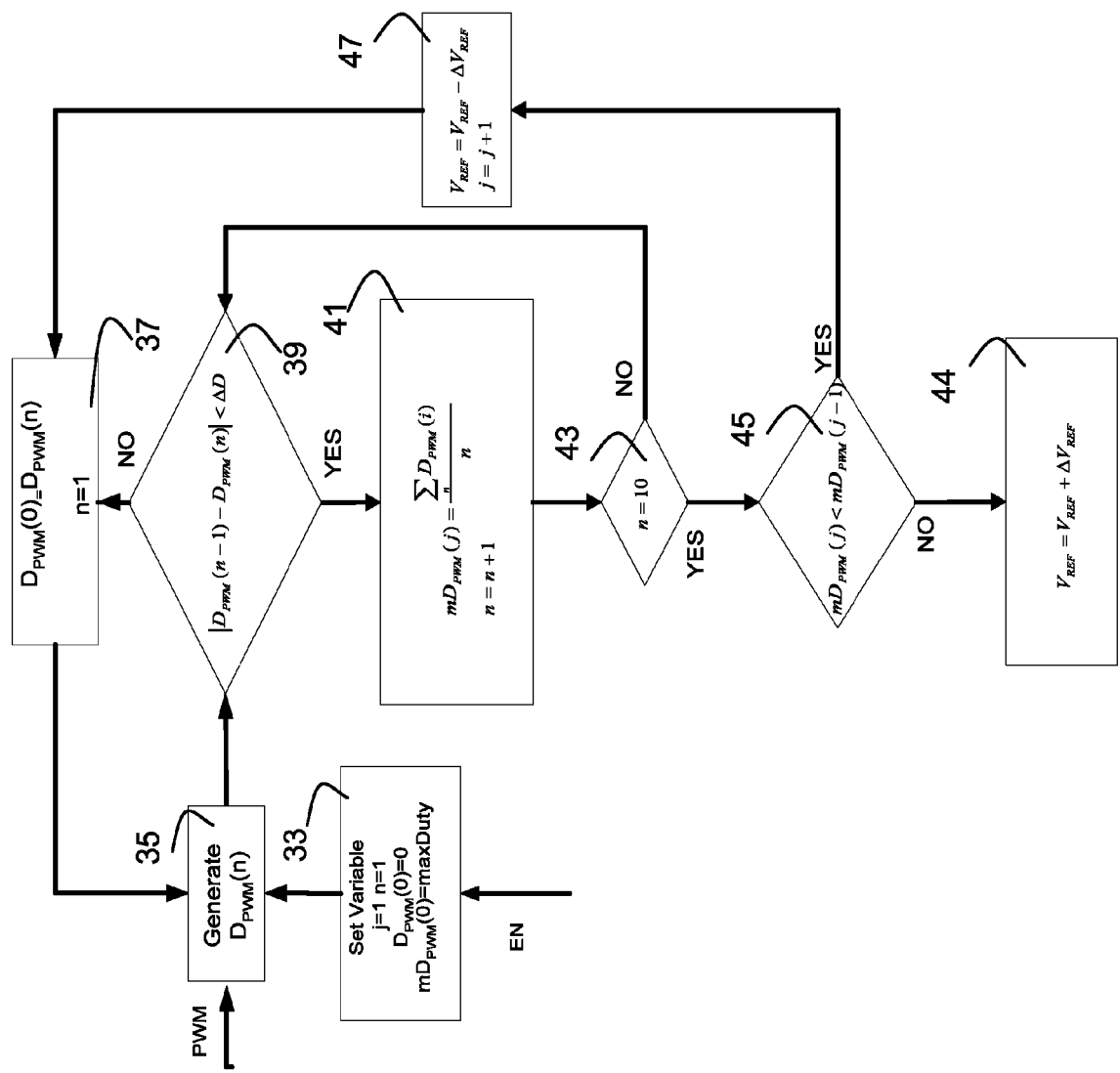
FIG. 11 illustrates a flow diagram for an exemplary method embodiment of the invention.

FIG. 11 provides in an exemplary flow chart, an alternative method for performing the functions of duty cycle observer 23 without the use of any test bench trimming. Other methods and approaches may be used that provide a voltage reference that will minimize the duty cycle of the PWM during DCM mode operations. As explained above, other parameters may be varied to compensate the circuit and minimize the duty cycle of the PWM during DCM mode operations, varying the voltage −Vref is a non-limiting illustrative example.

In operation the method of FIG. 11 begins by responding to an ENABLE input EN and enters state 33. In an alternative embodiment, the ENABLE signal may be omitted. The ENABLE input is optional but will indicate to the duty cycle observation function that the PWM controller is in DCM mode. In other words, the duty cycle observation controller should not operate when the PWM circuit is in CCM mode, but only when the load is demanding a light current output. After the ENABLE input EN in state 33, an initial value for the duty cycle $D_{PWM}(0)$ is set to zero. The variable $mD_{PWM}(0)$ is set to "maxDuty". This variable is the average duty cycle.

In state 35, the duty cycle $D_{PWM}(n)$ is generated. This step is performed in response to a PWM cycle shown as an input to state 35. The exit from this state is to a decision state 39. An inequality condition in state 39 tests whether the duty cycle is in a steady state. In this exemplary embodiment, the steady state condition is detected by comparing the difference in the duty cycle over two cycles to a variable AD. AD is a threshold that is selected to reject cases where the duty cycle is rapidly changing. If the last two cycles are not sufficiently close together in value, indicating a steady state has been reached, the condition is not met and the exit from state 39 enters a state 37. In state 37, the variable n is again set to 1, and the variable $D_{PWM}(0)$ is set to the last value. The state diagram then returns to state 35 and a new value $D_{PWM}(n)$ is calculated in response to the next cycle on PWM.

Assuming that the inequality condition in state 39 is met, the state diagram of FIG. 11 then transitions to the state 41 where an average duty cycle calculation is performed. For an n value of 10 (this value is set by design and may be set to provide many more, or far less, iterations, such as 2 or 20 as non limiting examples) the value $mD_{PWM}(j)$ is determined for the sum i=1 to n, then divided by n. After the average is determined, n is increased by 1.

By averaging a plurality of samples, the value for $mD_{PWM}(j)$ is determined as an average over many cycles, thereby removing the chance that a particular duty cycle is an error or an outlying sample or the duty cycle is rapidly changing.

After n reaches the desired number of samples, 10 in this illustrative example, in state 43, the state diagram transitions to state 45. In state 45, a condition is tested. If the current value for the average duty cycle $mD_{PWM}(j)$ is less than the value on the prior cycle m $mD_{PWM}(j-1)$, then the average duty cycle is falling and the minimum duty cycle condition has not been reached. In this case the reference voltage Vref is decremented by a quantity delta Vref in state 47, and the counter indice j is incremented. The duty cycle average calculation loop then repeats.

In contrast, if the inequality condition of state 45 is not met, then that indicates the average duty cycle is not falling in response to the last reduction in Vref. In this condition, the duty cycle observer function has reached a minimum duty cycle. When the duty cycle is at a minimum during the DCM operation, the zero crossing detection provided by the embodiment is working at its most efficient point, and the turn off time for the synchronous rectifier as determined in this example by voltage −Vref is at the right level for the particular components and conditions. Since the state 45 inequality actually indicates that the duty cycle is increasing since the last average was evaluated, the voltage Vref has actually been reduced beyond the best point. Therefore in the final state 44, state 44 restores the voltage Vref to the previous value by incrementing it by the step amount ΔVref. At this point the voltage reference has set the trip point of the comparator in FIG. 10 so that the circuit is operating at its most efficient point for the diode emulation in DCM.

Figures 1A, 1B:
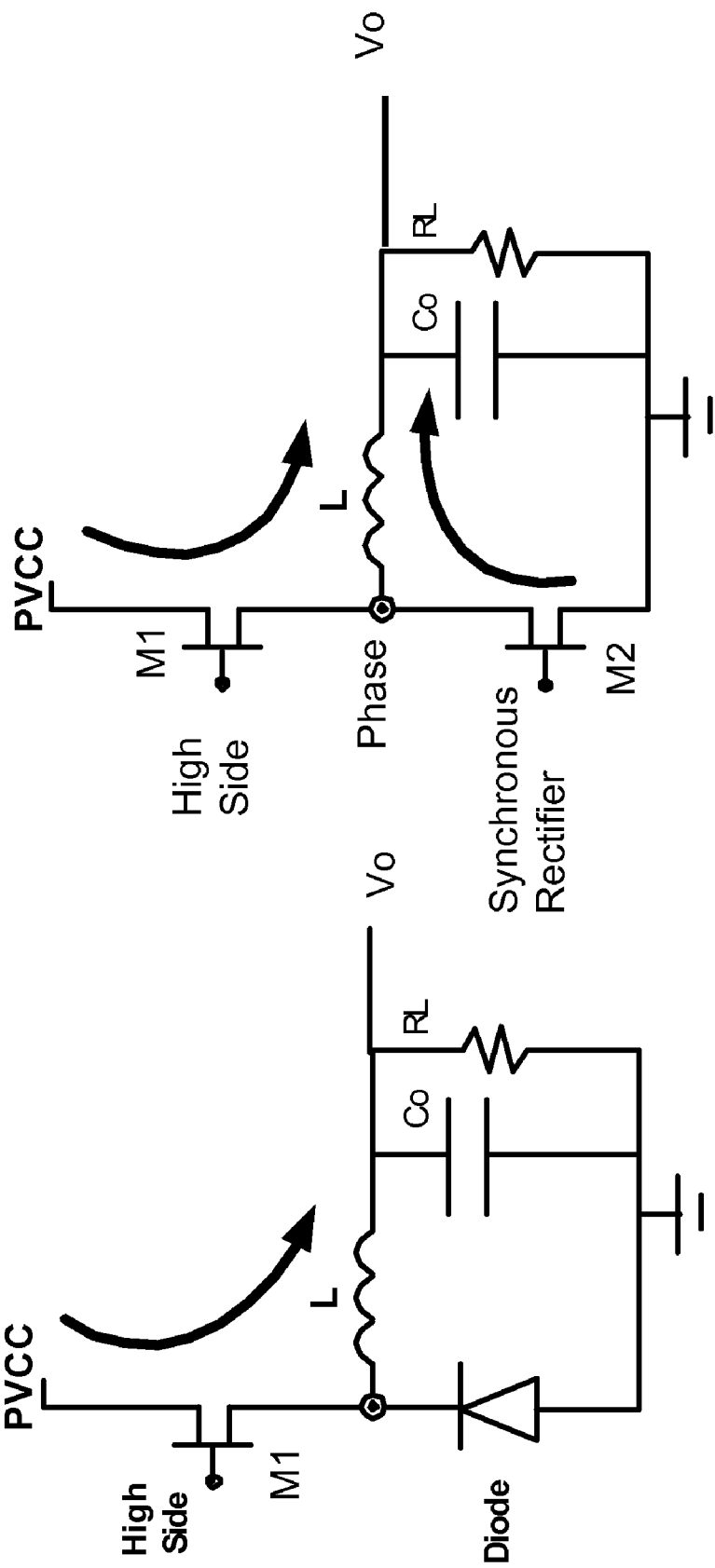
FIG. 1(*a*) illustrates a prior art asynchronous buck converter.
Figure 2:
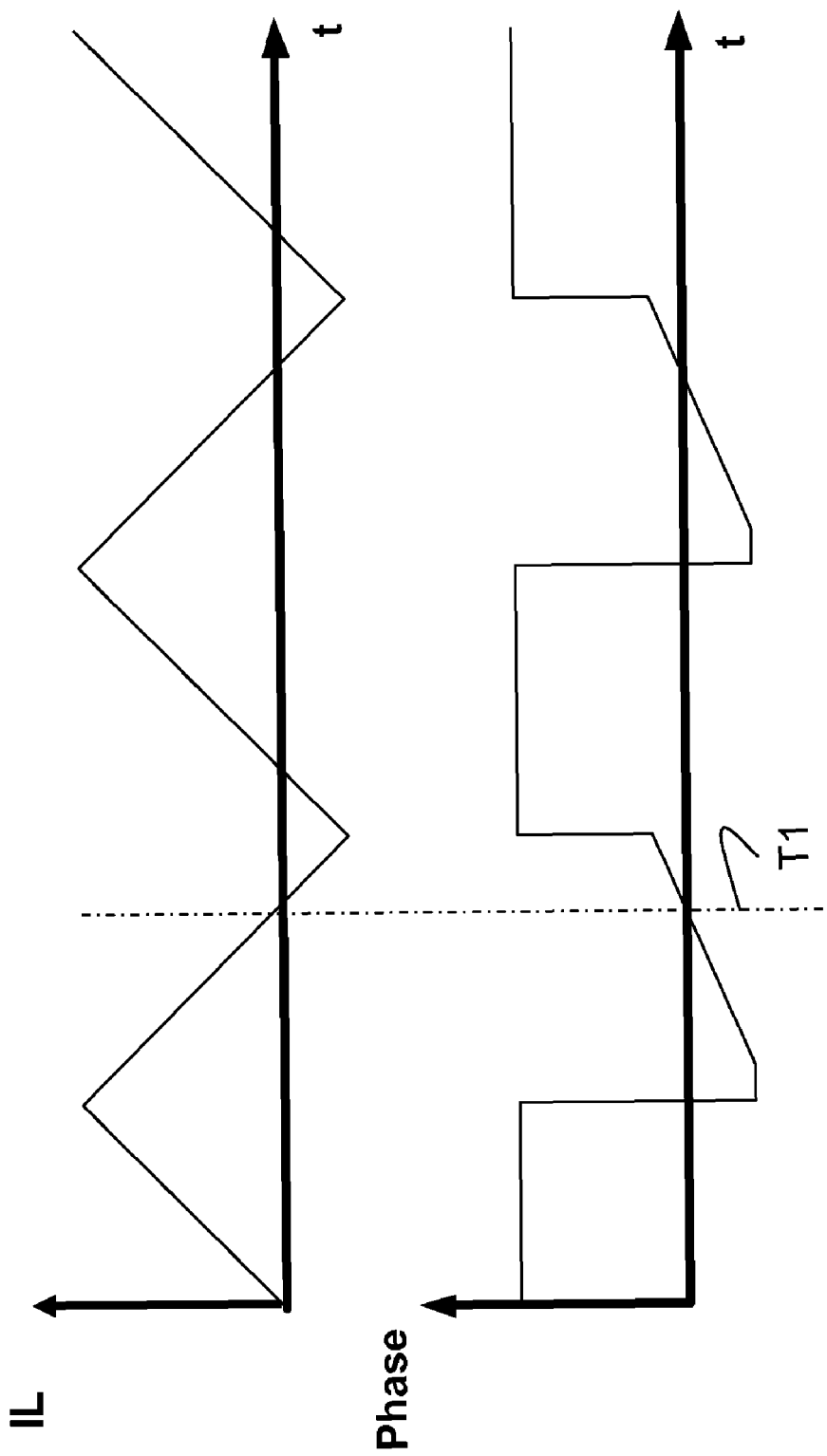
FIG. 2 depicts the inductor current and phase node voltage for a synchronous buck converter in discontinuous conduction mode.
Figure 3:
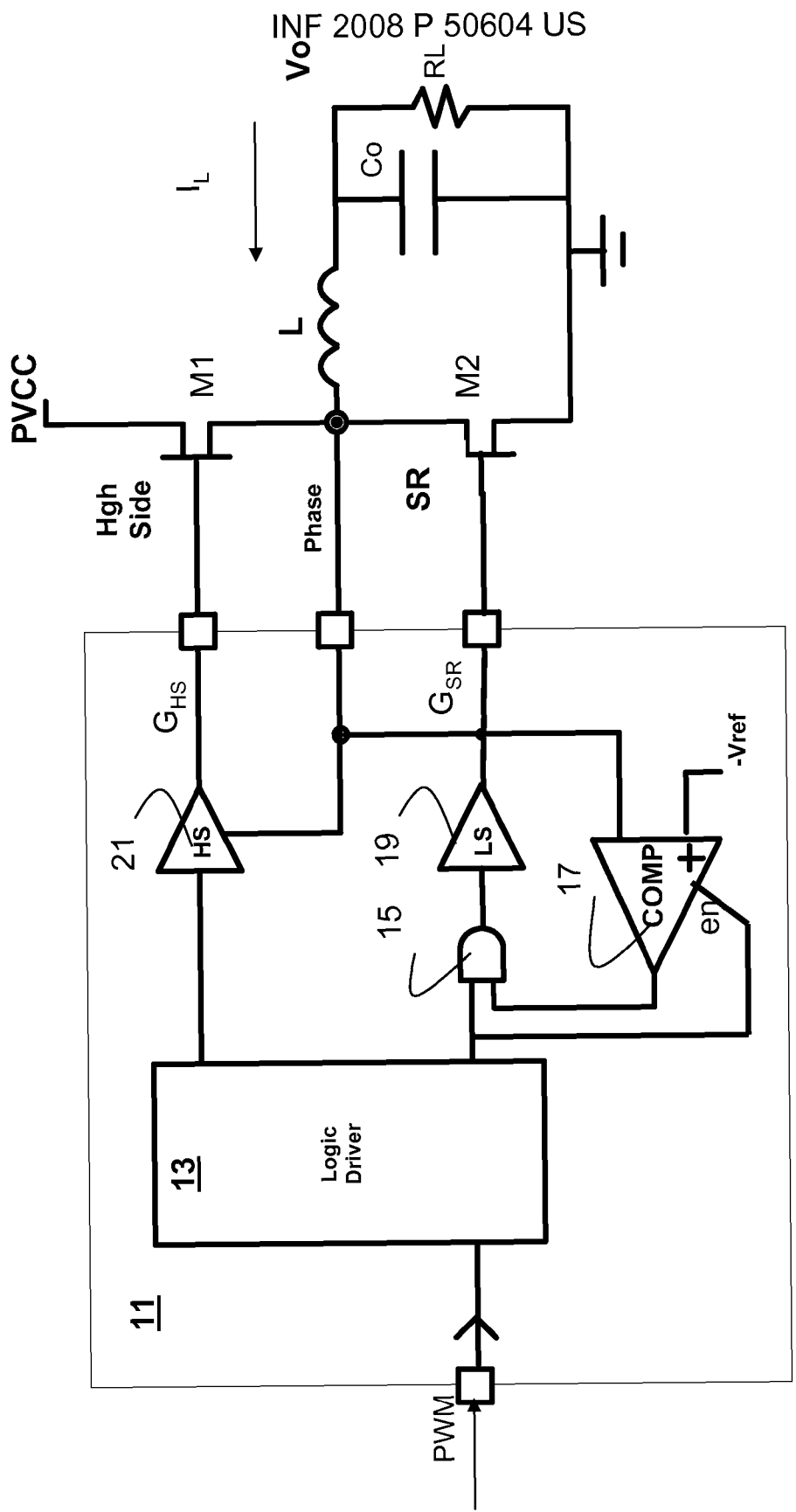
FIG. 3 illustrates a prior art controller circuit for providing the high side and synchronous rectifier control signals to a synchronous buck converter.
Figure 4:
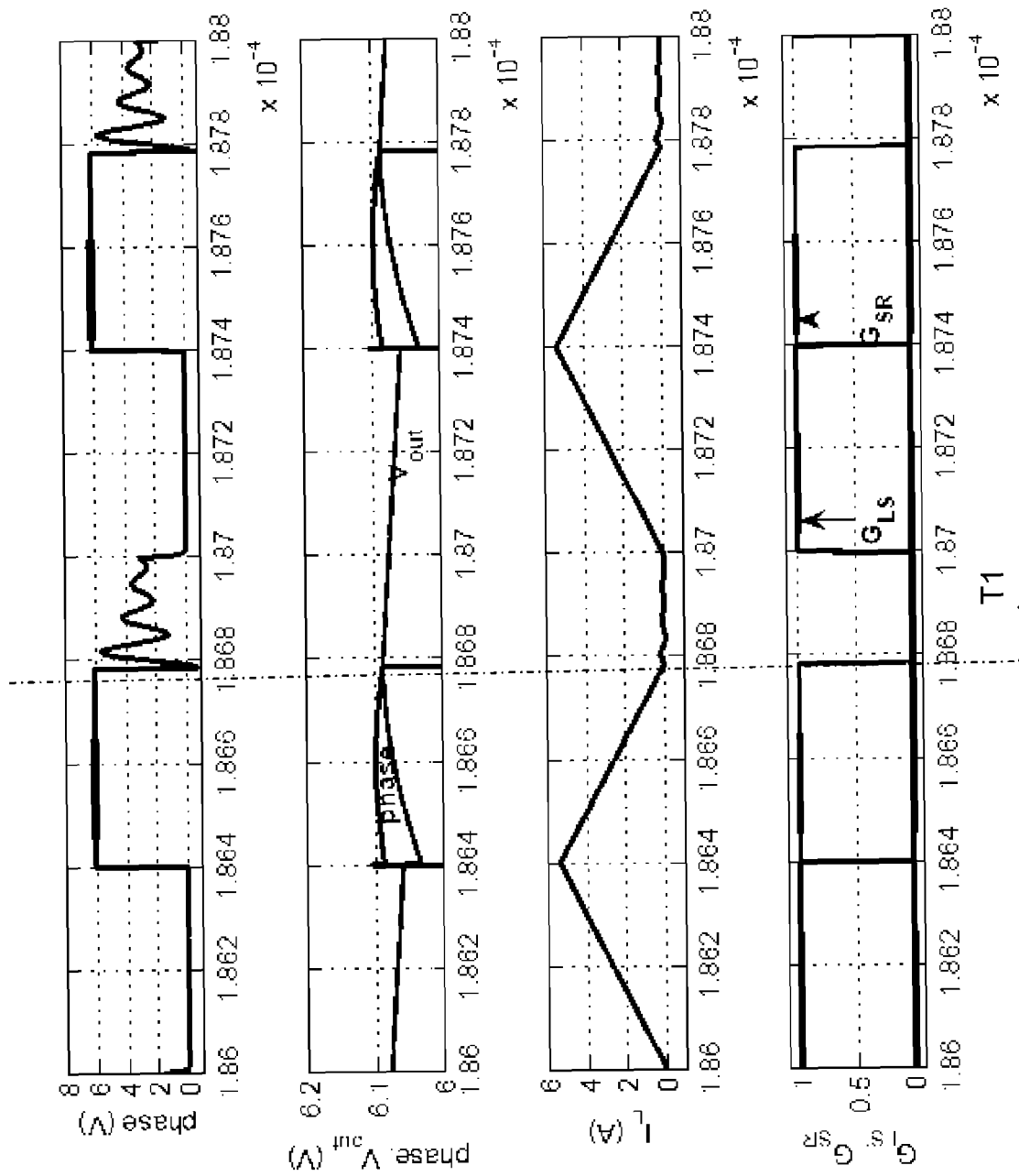
FIG. 4 illustrates timing diagrams from a simulation of the operation of the circuit of FIG. 3.
Figure 5:
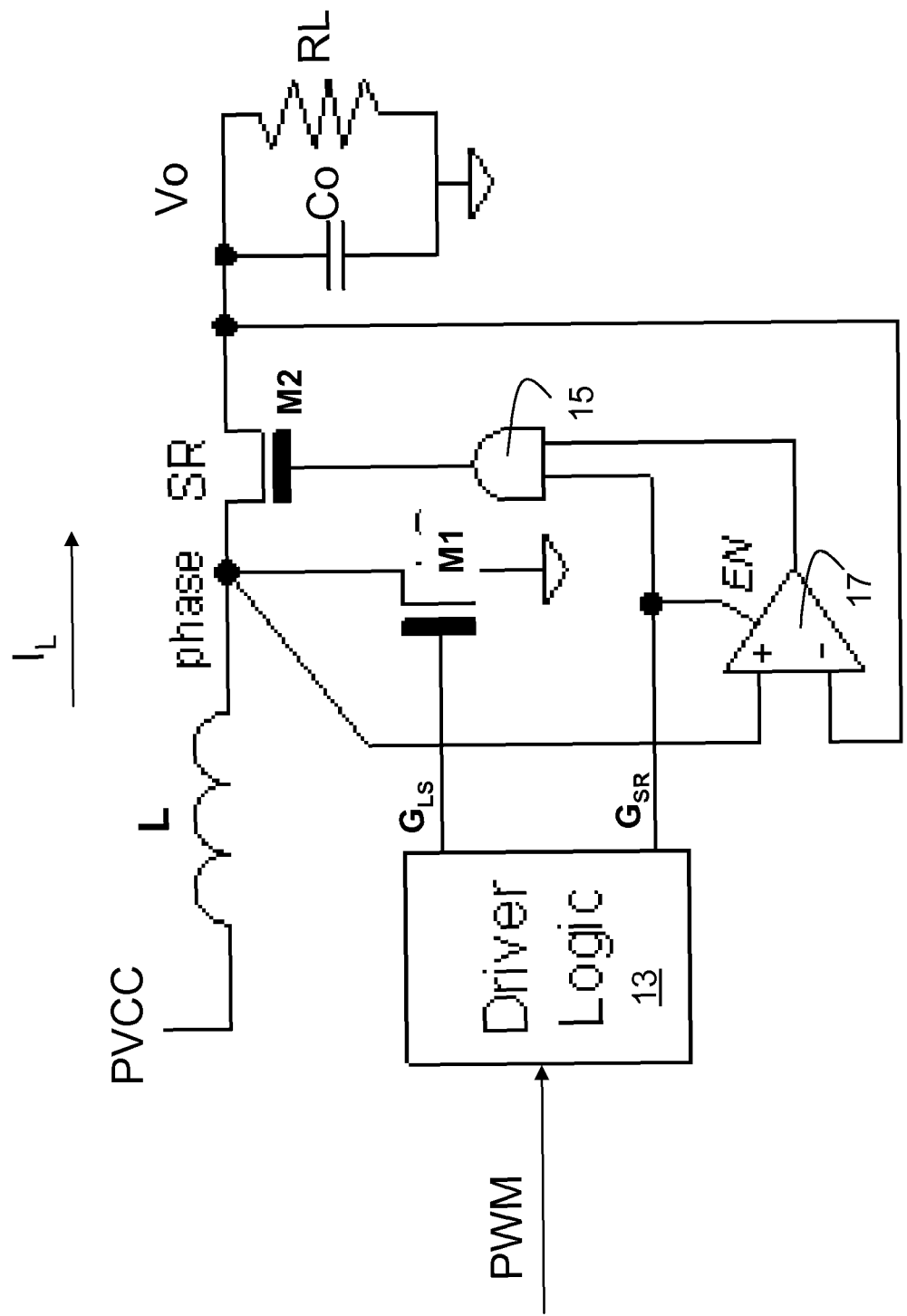
FIG. 5 illustrates a prior art controller circuit for providing the gating signals for a synchronous boost converter.
Figure 6:
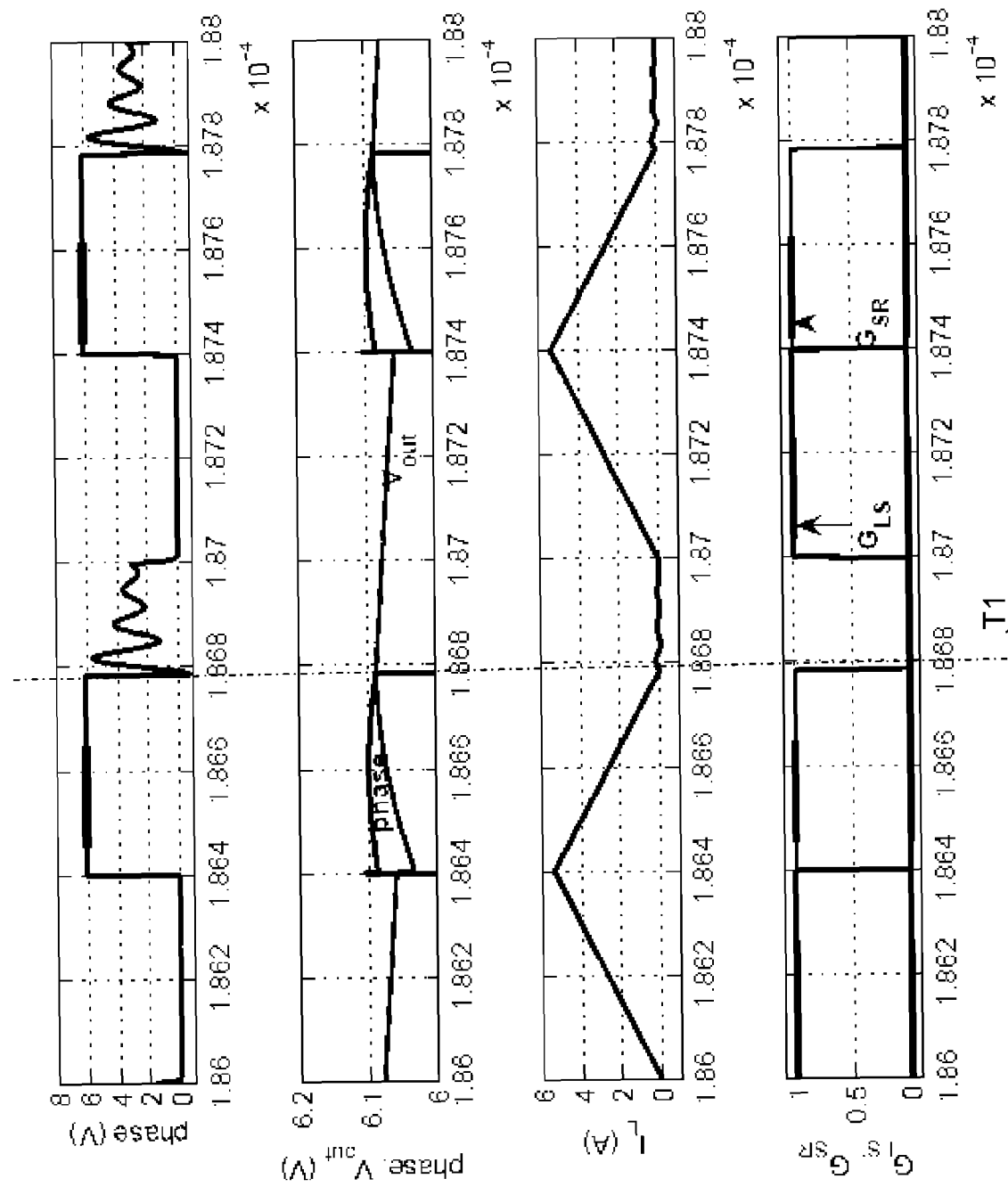
FIG. 6 illustrates timing diagrams from a simulation of the operation of the circuit of FIG. 5.
Figure 7:
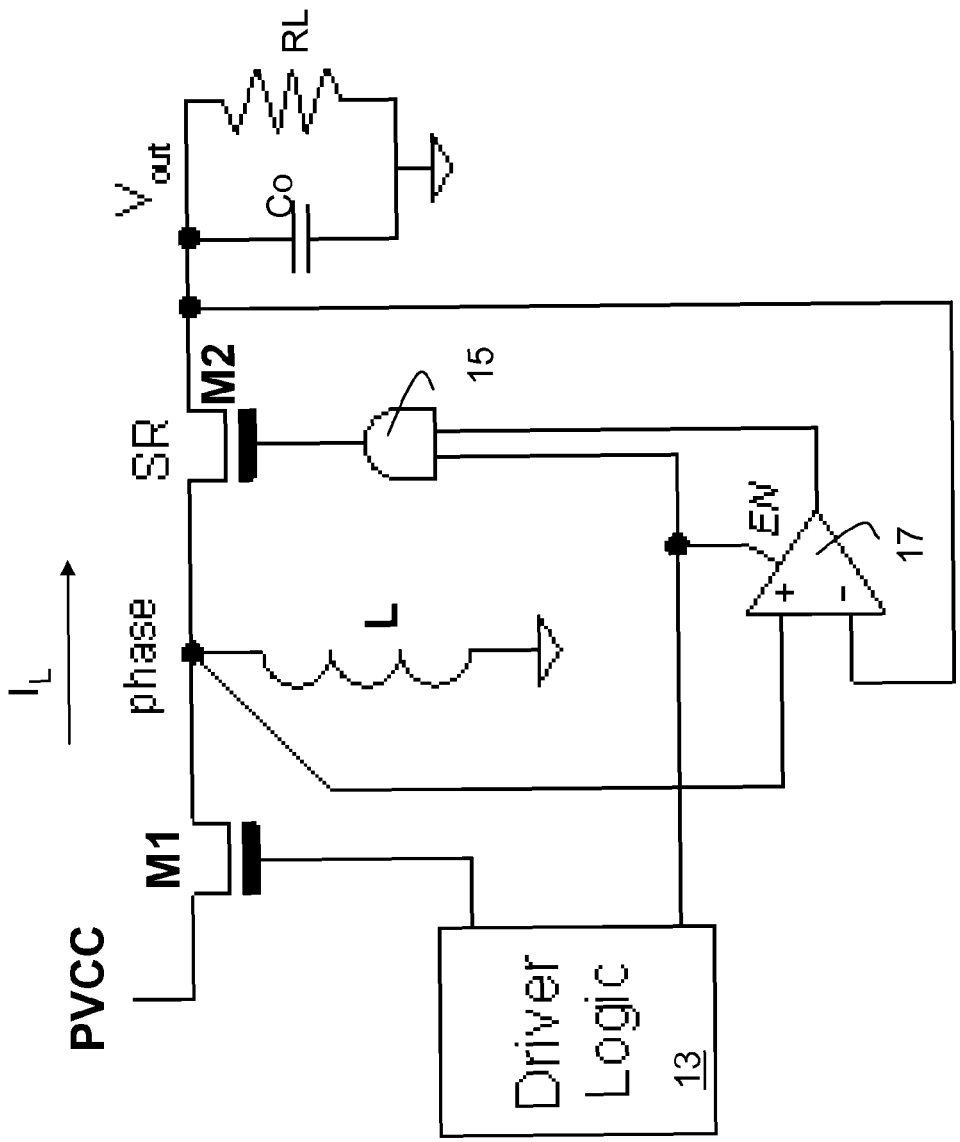
FIG. 7 illustrates a prior art controller circuit for providing the gating signals for an inverting buck-boost synchronous converter.
Figure 8:
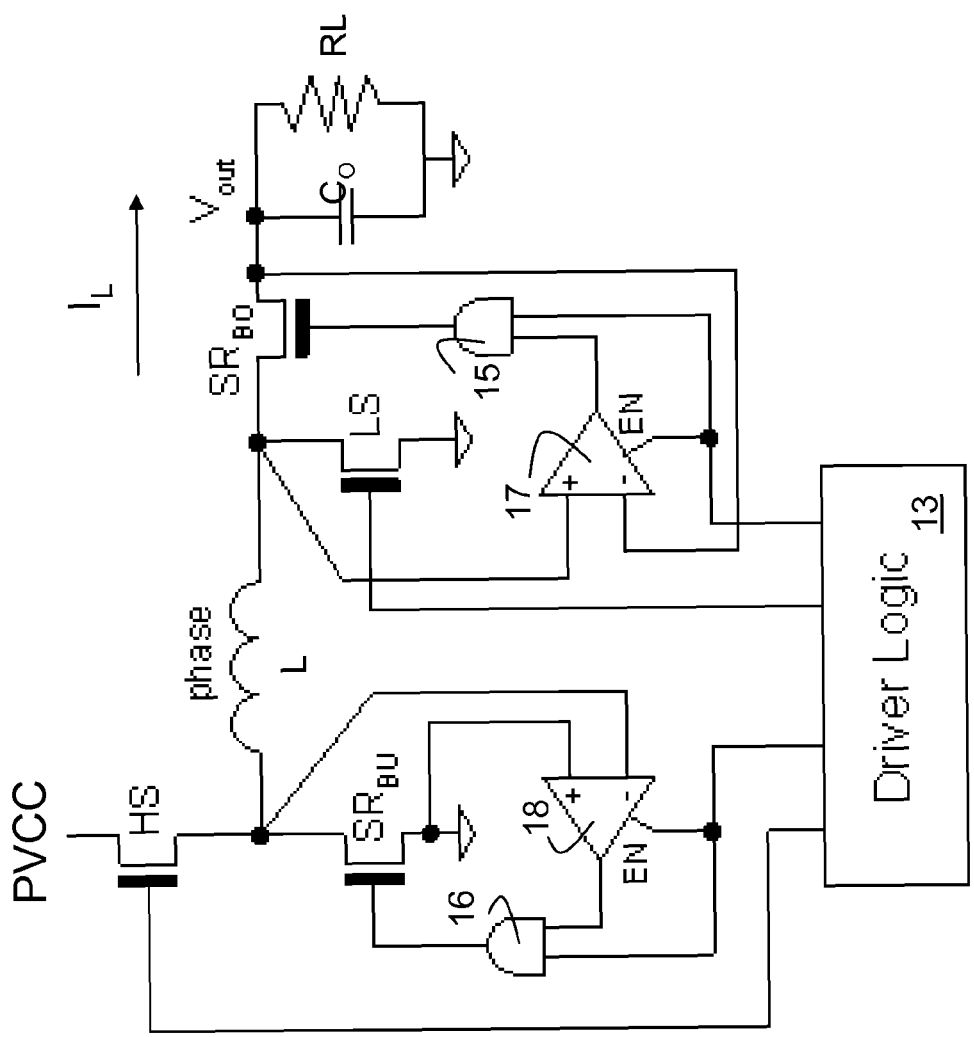
FIG. 8 illustrates a prior art controller circuit for providing the gating signals for a non-inverting buck-boost synchronous converter.
Figure 9:
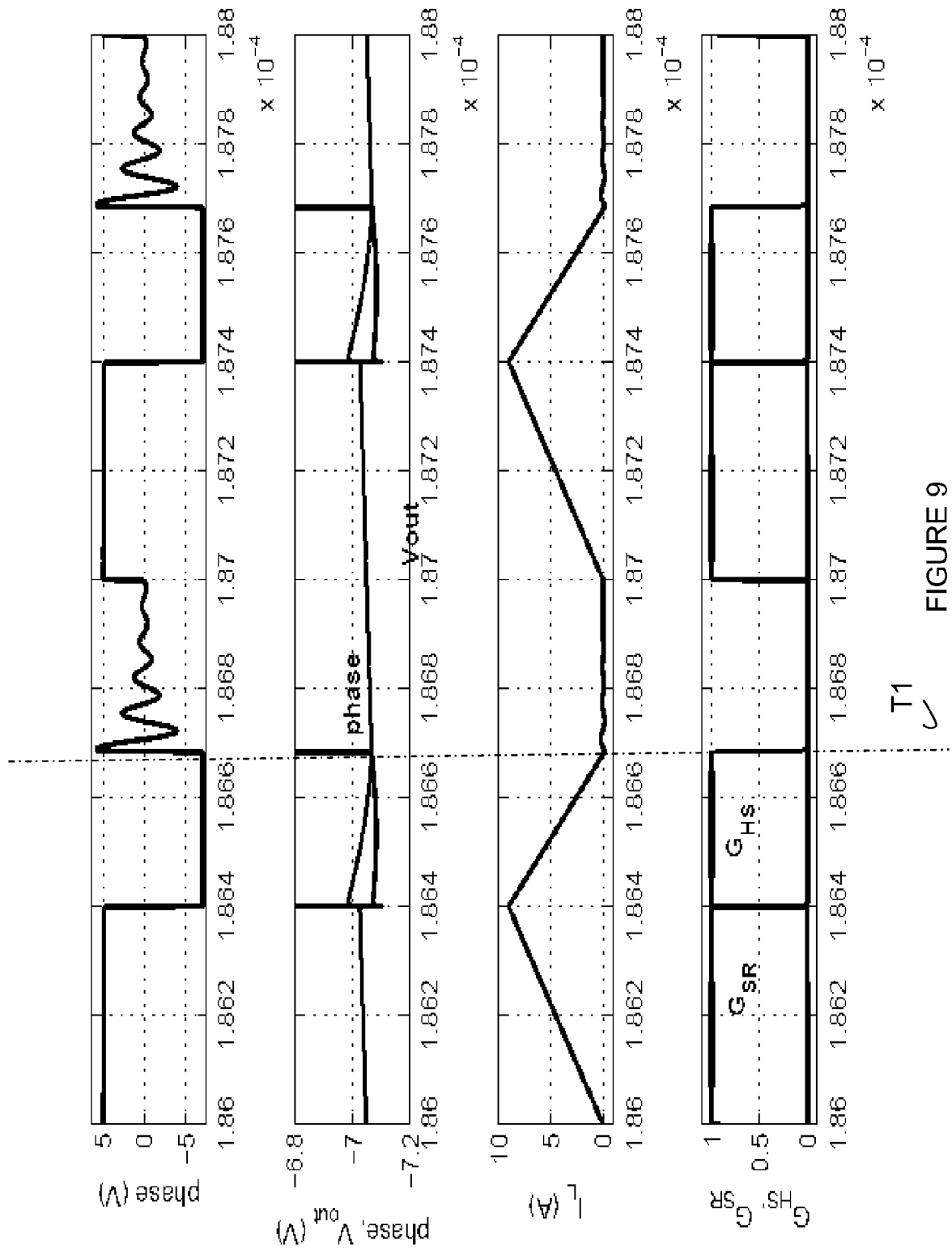
FIG. 9 illustrates a timing diagrams from a simulation of the operation of the circuit of FIG. 7.

The state diagram of FIG. 11 depicts in one illustrative embodiment the functions that the duty cycle observer 23 in FIG. 4 should perform. The actual implementation of the duty cycle observer 23 can take one of several forms that are also contemplated as alternate exemplary embodiments of the invention and which are within the scope of the appended claims. The duty cycle observer 23 may be implemented by a state machine, a programmable logic device or PLD, an FPGA, dedicated logic circuitry and registers, software or firmware, and any combination of these. A programmable IC such as a DSP or microprocessor could be used and software written to perform the functionality, alternatively a core function such as a RISC core could be used in an ASIC or semi-custom IC. Programmable arrays such as field programmable gate arrays (FPGAs) could be used as well.

Further, the circuit 12 of FIG. 10 could be implemented as a circuit on a circuit board, as a stand alone IC, as an ASIC or semi-custom device, in off the shelf integrated circuitry, or integrated either with the controller IC that develops the PWM signal, or with the driver transistors, or some other arrangement including part of the circuitry in an IC or discrete devices could be used.

The duty cycle observer and the automatic compensation to find the optimum operating point for the "turn off" of the SR device in DCM mode described above with respect to the buck converter example can also be extended to other switching converter topologies where zero crossing detection is used to limit current losses; for example, the buck, boost, and buck boost converters describe in the background section may all benefit from the use of the exemplary embodiments of the invention.

Although the present invention and its advantages have been described in detail, it should be understood that various changes, substitutions and alterations can be made herein without departing from the spirit and scope of the invention as defined by the appended claims. For example, although differential operational amplifier circuits are shown in some embodiments, known circuit design alternatives could be used to implement the functions.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling a synchronous converter, comprising:
   providing a synchronous rectifier (SR) gating control signal in response to a pulse width modulated input signal for use in a synchronous converter;
   inhibiting the SR gating control signal at a nominal turn off time corresponding to an estimated zero crossing point for a load current;
   modifying the nominal turn off time by a delta amount;
   determining if an average duty cycle for the pulse width modulated input signal is increased in response to the modification; and
   repeating the modifying and determining steps until the average duty cycle for the pulse width modulated input signal is increased.

2. The method of claim 1, wherein determining if the average duty cycle for the pulse width modulated signal is increased further comprises:
   determining the duty cycle of the pulse width modulated input signal for n cycles;
   determining the present average duty cycle for the n cycles;
   comparing the present average duty cycle for the n cycles to a stored prior average duty cycle; and
   indicating whether the present average duty cycle is increasing.

3. The method of claim 1, and further comprising:
   prior to determining if the average duty cycle for the pulse width modulated input signal is increased in response to modifying the nominal time by a delta time, determining whether the duty cycle of the pulse modulated input signal is in a steady state condition.

4. The method of claim 3, wherein determining if the duty cycle is in a steady state condition further comprises:
   determining the duty cycle for a first cycle;
   determining the duty cycle for a second cycle; and
   determining whether the difference between the first and second cycles is less than a threshold.

5. The method of claim 1, wherein prior to inhibiting the SR gating control signal, determining the state of an enable signal indicating the synchronous converter is operating in a discontinuous conduction mode.

6. The method of claim 1, wherein inhibiting the SR gating control signal at a nominal turn off time corresponding to an estimated zero crossing point for the load current further comprises receiving a phase node voltage from the synchronous converter;
   comparing the phase node voltage to a nominal reference voltage; and
   inhibiting the SR gating control signal in response to the comparison.

7. The method of claim 6, wherein modifying the nominal turn off time by a delta amount further comprises modifying the nominal reference voltage by a delta voltage.

8. The method of claim 6, wherein comparing the phase node voltage to a nominal voltage reference further comprises comparing the phase node voltage to a nominal voltage reference that is less than or equal to zero volts.

9. The method of claim 1 where the synchronous converter is a buck converter.

10. A circuit, comprising:
    a high side driver control circuit for outputting a gating signal to a high side driver of a synchronous converter, responsive to a pulse width modulated input signal;
    a synchronous rectifier (SR) driver circuit for outputting a gating signal to an SR of the synchronous converter responsive to the pulse width modulated input signal;
    an inhibit circuit for inhibiting the gating signal to the SR upon detection of a zero crossing condition;
    circuitry for detecting the zero crossing condition respective to comparing a measured value to a nominal value adjusted by a delta value; and
    a duty cycle observer circuit for determining the average duty cycle of the pulse width modulated input signal and for varying the delta value.

11. The circuit of claim 10 wherein the duty cycle observer circuit further comprises circuitry for varying the delta value, circuitry for comparing the previous average duty cycle to the average duty cycle, and circuitry for determining if the average duty cycle is increased in response to varying the delta value.

12. The circuitry of claim 11, wherein the circuitry for detecting the zero crossing condition respective to comparing a measured value to a nominal value adjusted by a delta value comprises:
    a comparator receiving a phase node voltage from the synchronous converter and comparing the phase node voltage to a reference voltage adjusted by a delta voltage.

13. The circuitry of claim 12, wherein the inhibit circuit for inhibiting the gating signal to the SR upon detection of a zero crossing condition further comprises a circuit that inhibits the SR gating signal responsive to the comparator.

14. The circuit of claim 13 wherein the duty cycle observer circuit reduces the voltage reference by the delta voltage, determines whether the average duty cycle is increased from the previous average duty cycle, and if the average duty cycle has not increased, repeats the last two steps.

15. The circuit of claim 10 wherein the circuit further comprises an enable circuit for enabling the duty cycle observer circuit and the inhibit circuit when the synchronous converter is operating in a discontinuous conduction mode.

16. The circuit of claim 10, wherein the synchronous converter is one selected from the group of a buck topology converter, a boost topology converter and a buck-boost topology converter.

17. An integrated circuit, comprising:
    a first buffer circuit for driving a high side driver of a synchronous converter circuit responsive to a pulse width modulated input signal;
    a second buffer circuit for driving a synchronous rectifier (SR) of a synchronous converter circuit, responsive to the pulse width modulated input signal;
    an inhibit circuit for inhibiting the second buffer circuit responsive to a detection of a zero crossing condition;
    a zero crossing detection circuit outputting a signal indicating detection of a zero crossing condition responsive to comparing a measured value to a nominal reference value adjusted by a delta value; and
    a duty cycle observer circuit for determining the average duty cycle of the pulse width modulated input signal and having an output that varies the delta value by a predetermined value.

18. The integrated circuit of claim 17 wherein the duty cycle observer further comprises:
- circuitry for determining the average duty cycle of the pulse width modulated input signal;
- circuitry for varying the reference value by the predetermined delta value;
- circuitry for determining if the average duty cycle of the pulse width modulated input signal decreased in response to the varying of the reference amount; and
- circuitry for repeating the above three steps until the average duty cycle of the pulse modulated input signal increases.

19. The integrated circuit of claim 17 wherein the circuitry for determining the average duty cycle of the pulse width modulated input signal further comprises circuitry for determining the duty cycle of the pulse width modulated input signal for each duty cycle of the pulse width modulated input signal over a period of n cycles, wherein n is a positive integer.

20. The integrated circuit of claim 18 wherein the circuitry for determining if the average duty cycle of the pulse width modulated input signal decreased in response to the varying of the reference amount further comprises circuitry for storing the average duty cycle for a previous cycle.

21. A synchronous buck converter circuit, comprising:
- a high side driver having a current conduction path coupled between a positive power supply and a phase voltage node, and having a high side control input;
- a synchronous rectifier (SR) driver having a current conduction path coupled between a phase voltage node and a ground reference, and having an SR control input;
- an output inductor coupled in series between the phase voltage node and a voltage output terminal for supplying a load;
- an output capacitor coupled between the voltage output terminal and the ground reference;
- a gating signal control circuit for supplying the high side control input and the SR control input, comprising:
  - a high side output buffer for driving the high side control input responsive to a pulse width modulated input signal;
  - a SR output buffer for driving the SR control input responsive to the pulse width modulated input signal;
  - an inhibit circuit for inhibiting the SR output buffer responsive to a comparator output;
  - a comparator supplying the comparator output receiving the phase node voltage and a voltage reference; and
  - a duty cycle observer circuit receiving the pulse width modulated signal and determining the duty cycle of the pulse width modulated signal, and outputting the voltage reference responsive to the duty cycle.

22. The synchronous buck converter of claim 21, wherein the duty cycle observer circuit further comprises:
- a controller adapted to output a first reference voltage;
- a duty cycle calculator for determining the duty cycle of a received pulse modulated input signal;
- an average duty cycle calculator for determining the average duty cycle of a plurality of n cycles of the pulse modulated input signal;
- a storage for storing a previous average duty cycle;
- a circuit for performing a comparison of a present average duty cycle with a previously stored average duty cycle and determining whether the present average duty cycle is increased over the previously stored average duty cycle; and
- the controller modifying the reference voltage by a delta voltage in response to the comparison.

23. The synchronous buck converter of claim 22, wherein the controller further is adapted to:
- reduce the reference voltage by the delta voltage;
- store the present average duty cycle as the previous average duty cycle in the storage;
- determine a new present average duty cycle;
- perform a comparison of the new present average duty cycle with the stored previous average duty cycle; and
- if the comparison indicates the average duty cycle is decreasing, repeat the last four steps.

24. The synchronous buck converter of claim 23, wherein the controller is further adapted to:
- determine that the comparison indicates the average duty cycle is increasing, and if so, increase the reference voltage by the delta voltage.

25. An apparatus, comprising:
- means for outputting a gating signal to a high side driver of a synchronous converter responsive to a pulse width modulated input signal;
- means for outputting a gating signal to a synchronous rectifier (SR) driver of a synchronous converter responsive to the pulse wide modulated input signal;
- means for inhibiting the gating signal to the SR driver circuit upon detection of a zero crossing condition;
- means for comparing a measured circuit value from the synchronous converter and a reference value, and outputting a zero crossing detected condition; and
- means for determining the average duty cycle of the pulse width modulated input signal and for varying the reference value.

26. The apparatus of claim 25 wherein the means for determining the average duty cycle of the pulse width modulated input signal further comprises:
- means for varying the reference value;
- means for comparing the previous average duty cycle to the average duty cycle; and
- means for determining if the average duty cycle is increased in response to varying the reference value.

27. The apparatus of claim 25, wherein the means for comparing a measured circuit value from the synchronous converter and a reference value, and outputting a zero crossing detected condition further comprises:
- means for receiving a phase node voltage from the synchronous converter;
- means for comparing the phase node voltage to a reference voltage; and
- means for adjusting the reference voltage.

28. The apparatus of claim 25, wherein the means for means for determining the average duty cycle of the pulse width modulated input signal and for varying the reference value further comprises a state machine.

* * * * *